Dec. 27, 1927.

J. L. HARPER 1,653,627

DRINKING GLASS WASHER

Filed May 21 1926

Inventor.
John L. Harper

Dec. 27, 1927.
J. L. HARPER
1,653,627
DRINKING GLASS WASHER
Filed May 21 1926 2 Sheets-Sheet 2
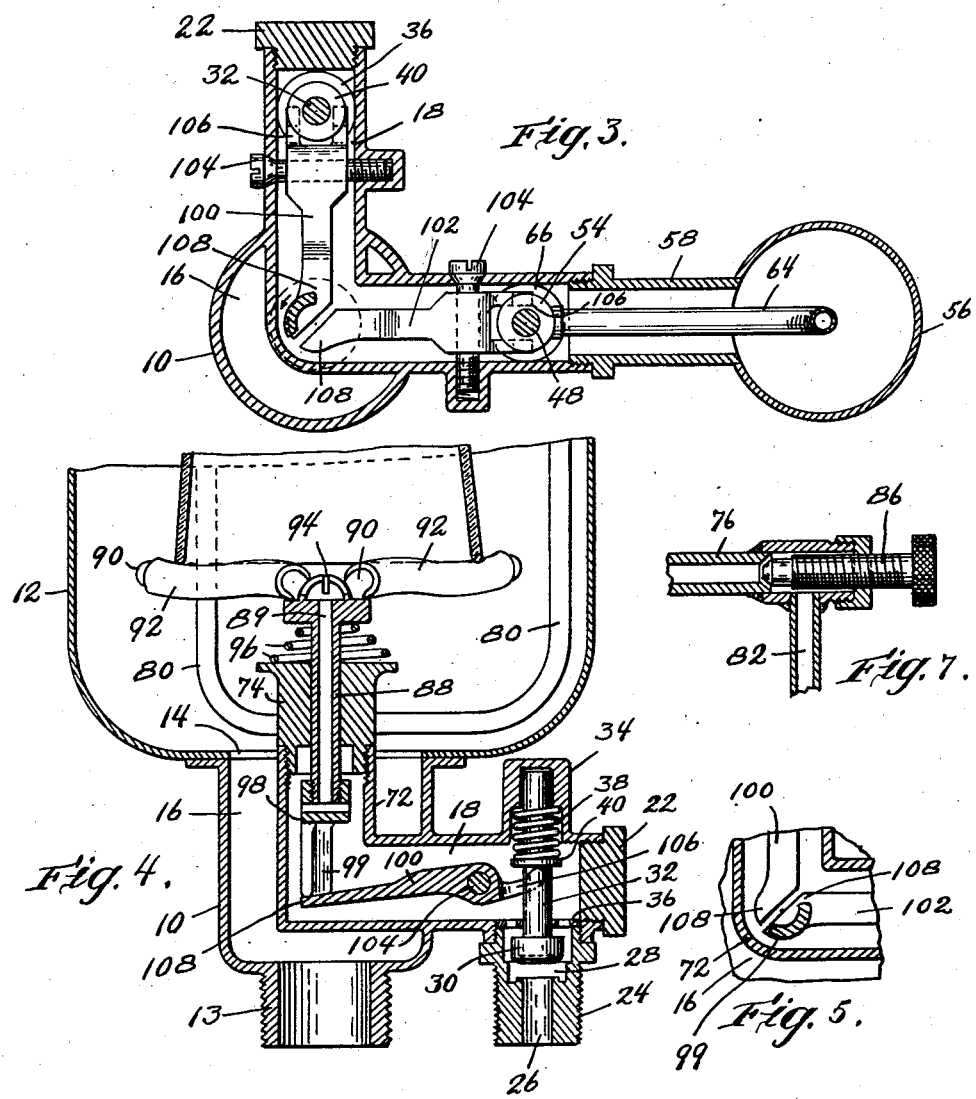
Inventor
John L. Harper
by
_____ atty Patented Dec. 27, 1927.

1,653,627

UNITED STATES PATENT OFFICE.

JOHN L. HARPER, OF BOSTON, MASSACHUSETTS, ASSIGNOR TO AMERICAN SODA FOUNTAIN COMPANY, OF BOSTON, MASSACHUSETTS, A CORPORATION OF MAINE.

DRINKING-GLASS WASHER.

Application filed May 21, 1926. Serial No. 110,797.

This invention relates to apparatus for washing drinking glasses and the like and is especially adapted for use at soda fountains, although not limited to such use.

A common type of washer includes a bowl in which the inverted drinking glass is adapted to be inserted, with spraying devices so disposed that a downward movement of the glass within the bowl operates valve mechanism to admit water to the spraying devices and cause jets of water to be forcibly discharged onto both the inside and outside surfaces of the glass. Such a device rinses, rather than actually cleans, since cold water is commonly employed, which has but little solvent action on a grease film or other soil that may be adherent to the glass.

An object of this invention is the provision of a washer of the above general type so arranged that jets of hot soapy water can be played onto the glass, thereby to dissolve and remove the soil thereon and thus effectively to clean the glass.

A further object is the provision of a drinking-glass washer so arranged that streams of hot soapy water, and fresh clean water, can be played alternately on the glass, whereby to rinse the glass after it has been cleaned by the soapy water.

A further object is generally to improve the construction and operation of washers for drinking glasses.

Fig. 3 is a section along line 3—3 of Fig. 2.

Fig. 4 is a sectional detail of the lower part of the washer taken along line 4—4 of Fig. 2.

Fig. 5 is a detail illustrating the position of the actuating member for operating the hot-water valve.

Fig. 7 is a sectional detail of the regulating valve for the spray-ring.

Figure 1:
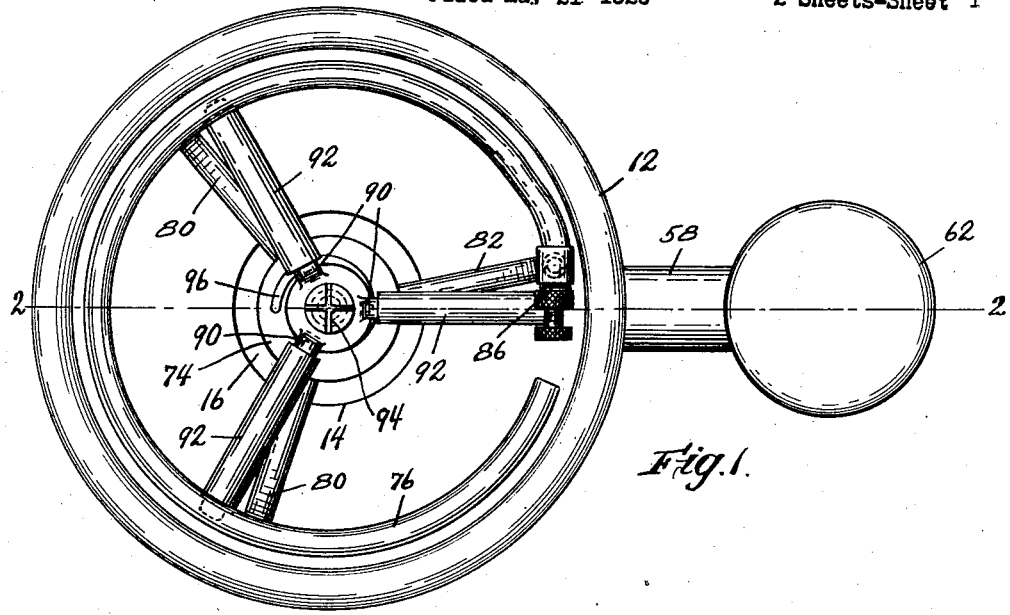
Fig. 1 is a plan view of a drinking glass washer embodying this invention.
Figure 6:
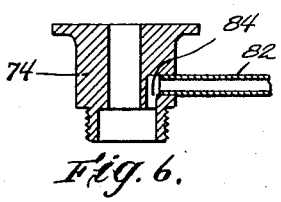
Fig. 6 is a sectional detail illustrating the manner connecting the water pipe for the spray-ring with the water chamber in the base of the bowl.

As here shown, the drinking glass washer embodying this invention includes a base 10 to the upper end of which is secured a vertical bowl 12. Said bowl is open at the top and has an opening 14 in the bottom which registers with a recess 16 in the base 10 through which waste water can escape. The base 10 may be provided with a screwthreaded extension 13 for connection with suitable waste-water pipe. The base is also provided with laterally extended conduits 18 and 20 respectively which are disposed approximately at right angles with each other and are integrally formed with each other and with said base 10. The outer end of said conduit 18 is closed by a removable screw plug 22. Said conduit 18 is provided with a depending nipple 24 which has a removably screw-threaded connection with said conduit 18 and has an exteriorly screw threaded lower end for detachable connection with a suitable cold-water pipe not shown. Said nipple has a water passage 26 therethrough which is in communication with a chamber 28. A valve 30 is disposed within said chamber and is adapted normally to seat upon the bottom wall thereof and thereby prevent the flow of water into said conduit 18. The upper end of the stem 32 of said valve is slidably received within a boss 34 of said conduit while the lower end of said stem is slidable in a perforated plate 36 which forms a cover for the chamber 28. A compression spring 38 is disposed about the upper end of said valve plate and bears against a shoulder of said boss 34 and against a shoulder 40 of said valve stem whereby yieldingly to maintain the valve closed.

The conduit 20 is provided with a similar nipple 42, the passage 44 of which is normally closed by a valve 46 which is disposed in the valve chamber 47 and has a valve stem 48 guided in a boss 50 of said conduit. A spring 52 encircles said valve stem and bears upon an enlargement 54 of said valve stem to maintain the valve yieldingly closed. The lower end of said nipple 42 is screwthreaded for connection with a hot water pipe, not shown.

A soap receptacle 56 is associated with said washer and is provided with a short pipe 58 at the lower end thereof which is screw-threaded removably into the open end of, and is thereby supported by, said conduit 20. Said receptacle is provided with a perforated shelf 60 above the opening of said pipe 58, on which shelf pieces of soap 61 are adapted to be supported. Said receptacle is provided with a removable cover 62 by which the soap supply may be replenished and said cover is adapted to make a water tight connection with said receptacle. A small pipe 64 is extended through the cover plate 66 of the valve chamber 47 of said nipple 42 and is extended through said pipe 58 and is terminated shortly above said shelf 60 whereby to discharge a stream of hot water against the soap in said receptacle. When said valve 46 is open, the hot soapy water is adapted to flow through the perforated shelf into the lower portion of the receptacle and thence through the pipe 58 into the conduit 20. The cover plate 66 is adapted to have one or more perforations 70 therein by which clear water is adapted to be admitted directly into the conduit 20, since it is not necessary to pass all of the hot water through the soap receptacle.

The conduits 18 and 20 terminate in a vertically extended conduit 72 which is common to both the aforesaid conduits and is centrally disposed within the chamber 16 of the base 10. The open end of said conduit is adapted to be closed by a hub 74 which is removably screw-threaded into said conduit 72 and extends thereabove. Said hub is adapted to support a circular spray-pipe 76 which is disposed in the upper portion of said bowl 12 adjacent the side wall thereof and is provided with a series of orifices 78 which are adapted to direct jets of water inwardly and downwardly against the outer surface of a drinking glass disposed within the bowl. Said ring is connected rigidly with said hub 74 by rods 80 and a pipe 82, which pipe is in communication with the interior of the pipe 72 through a passage 84 within said hub. The upper end of said pipe 82 is connected with one end of said spray ring 76 and an adjustable valve 86 is adapted to control the flow of water into said spray ring.

Figure 2:
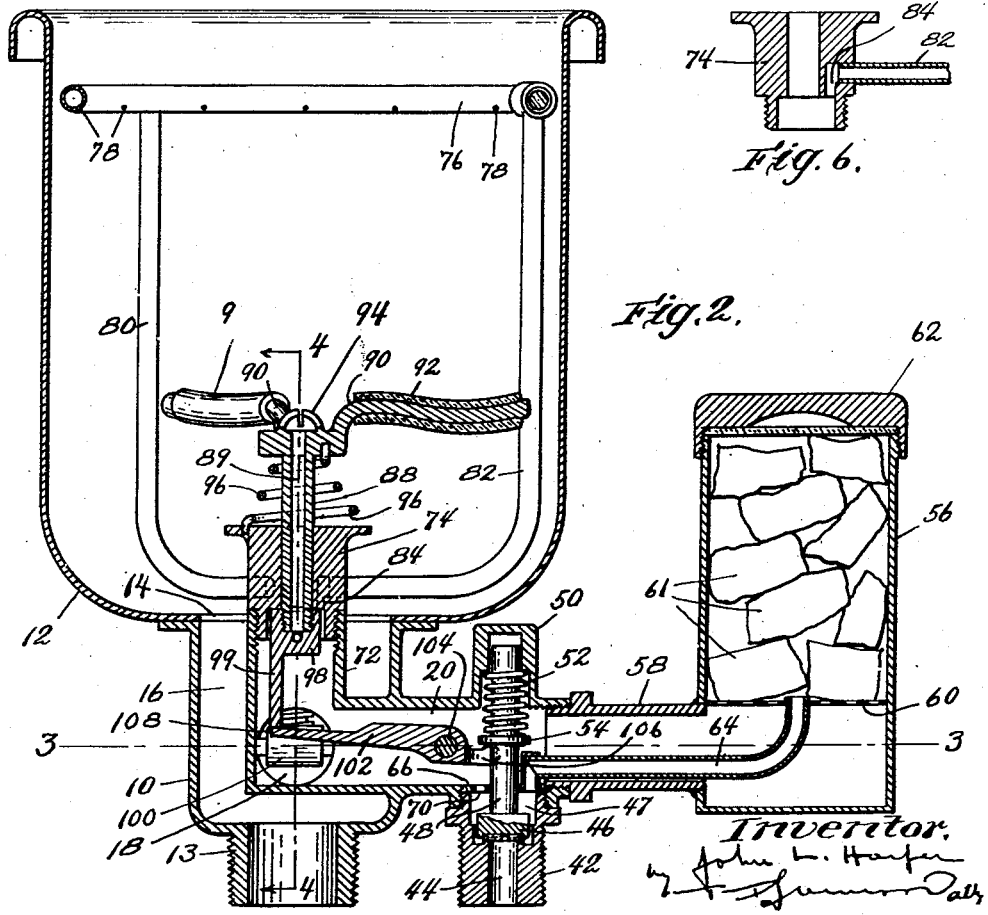
Fig. 2 is a sectional elevation along line 2—2 of Fig. 1.

A combined glass-support and valve-operator is disposed within said bowl and is adapted to be operated by movements of the glass to cause a spray of hot soapy water, or clear cold water, as may be desired, to be sprayed onto the glass. Said support includes a valve operating rod 88 which is slidably received in said hub 74 and is provided at its upper end with a plurality of outwardly extended arms 90 which are covered with rubber tubes 92 or other yielding cover material and are adapted to receive and frictonally engage the rim of the inverted drinking glass as illustrated in Fig. 4. Said rod 88 is provided with a water passage 89 therethrough which is in communication with the interior of said conduit 72 whereby, when water under pressure is in said conduit, a spray of water will issue from the top of said stem through the slits 94 and impinge against the inner surface of the drinking glass. Said rod 88 is held yieldingly in the elevated position illustrated in Fig. 2 by a conical compression spring 96 one end of which is fixed to the upper end of said rod 88 and the other end of which is fixed to said hub 74. A hub 98 is screw-threaded onto the lower end of said rod 88 and is provided with an eccentric depending and preferably arcuate extension 99 which is adapted, when said rod 88 is depressed, to operate either one or the other, or both of said water valves. Said valves are provided with valve-operating levers 100 and 102 respectively which are disposed within said conduits 18 and 20 and are pivoted on screws 104 carried by said conduits. Said valve-operating levers are provided with bifurcated ends 106 between the furcations of which the valve stems are received. Said furcations are disposed beneath the enlargements or shoulders 40 and 54 respectively of said valves and are adapted when depressed to raise said valves against the action of the compression springs associated therewith. Said levers are extended along said conduits and the free ends 108 are disposed adjacent each other beneath said conduit 72 and also beneath said projection 99.

The spring 96 of said valve-operator is adapted to maintain it yieldingly in elevated position with the projection 99 of said rod 88 out of operative engagement with the ends of said valve-operating levers and also to return said operator to the normal position illustrated in Fig. 1, by rotation in a counter-clockwise direction after the valve-operator has been rotated in a clockwise direction for the purpose of opening the hot water valve. One of said arms is adapted normally to engage one of said rods 80, which rod thereby serves as a stop member for the valve-operator.

In the normal arrangement of the parts, the projection 99 is adapted to be disposed above the valve-operating lever 100 for the cold water valve so that when the glass is depressed on the valve-operator, the cold water valve is opened and cold water is caused to flow onto the glass. When, however, the glass is first rotated in a clockwise direction while it is in frictional, and driving, engagement with the operator, the operator is rotated to bring the projection 99 above the lever 102 of the hot water valve. When the glass is then depressed, the hot water valve will be opened and hot soapy water will be caused to flow upon the glass.

Since ordinarily it is preferable first to clean and thence to rinse the glass, the first operation is usually to rotate and thence to depress the glass, thereby to operate the hot water valve, and then to raise the glass off the valve-operator, which automatically returns to its initial position. The glass then may be depressed and the cold water valve operated.

If desired, an attendant can rotate the valve-operator into some mid-position in which the projection 99 is above both valve-operating levers so that, upon depressing the glass, both hot and cold water is caused to flow into the spraying devices, thereby to temper the hot water. Ordinarily, however, this method of operation will not be practiced.

I claim:

1. A drinking glass washer having the combination of a bowl adapted to receive a drinking glass, a spraying device disposed to direct a stream of water onto the glass within the bowl, and means to supply said spraying device with water from two different sources including valve means adapted to be engaged and actuated by movement given the glass positioned in said bowl to control the flow of water from any one of said sources to said spraying device.

2. A drinking glass washer having the combination of a bowl adapted to receive a drinking glass, a spraying device arranged to direct a stream of water upon the glass within the bowl, means to supply said spraying device with water from two different sources, a movable stand adapted to receive and support the glass within the bowl, and valve means adapted to be actuated by movement given the glass positioned on said stand to control the flow of water from any one of said sources to said spraying device.

3. A drinking-glass washer having the combination of a bowl adapted to receive a drinking glass, a spraying device disposed to direct a stream of water onto the glass within the bowl, a soap container, a conduit arranged to conduct water to said soap container and thence to said spraying device, means arranged to by-pass said soap container and deliver clear water directly into said conduit, valve means governing the flow of water, and control means for said valve means disposed in position to be actuated by movements of the glass within the bowl.

4. A drinking glass washer having the combination of a bowl adapted to receive the glass, a spraying device disposed in position to direct a stream of water upon the glass within the bowl, a movable support for said glass, a soap receptacle, means to conduct water through said soap receptacle and the soapy water into said spraying device, and a valve disposed in said conducting means having an operative element disposed in position to be engaged and operated by said movable support.

5. A drinking glass washer having the combination of a bowl, a spraying device arranged to direct a stream of water against the glass within the bowl, two water-control valves having depressible valve-operating elements disposed beneath said bowl, and a rotatable and depressible support for the glass disposed above and in position to depress any one of said depressible elements.

6. A drinking glass washer having the combination of a bowl, a spraying device arranged to direct a stream of water onto a glass within the bowl, two water-control valves having depressible-valve-operating elements disposed beneath said bowl, a rotatable and depressible support for the glass disposed above said depressible elements and adapted to be rotated into position to depress any one of said depressible elements, and means including a spring arranged to rotate said support in one direction.

7. A drinking glass washer having the combination of a bowl, a spraying device arranged to direct a stream of water onto a glass within the bowl, a vertically-disposed rotatable and depressible rod disposed within the bowl and having outstanding arms at its upper end which comprise a support for the glass, a spring surrounding and connected with said rod beneath said arms and arranged to rotate said rod in one direction and also to hold said rod yieldingly in elevated position, and a pair of depressible valve-operating members disposed side-by-side beneath said projection, said rod having an eccentric projection at its lower end which can be moved into operative position above either of said depressible members and depressed into engagement therewith.

In testimony whereof, I have signed my name to this specification.

JOHN L. HARPER.